(12) United States Patent
Kazimiers et al.

(10) Patent No.: US 12,024,235 B2
(45) Date of Patent: Jul. 2, 2024

(54) METHOD FOR RECEIVING A VEHICLE CAB ON AN AGRICULTURAL BASE VEHICLE

(71) Applicant: DEERE & COMPANY, Moline, IL (US)

(72) Inventors: Thilo Kazimiers, Bahretal (DE); Markus Reif, Bad Dãœrkheim (DE)

(73) Assignee: DEERE & COMPANY, Moline, IL (US)

( * ) Notice: Subject to any disclaimer, the term of this patent is extended or adjusted under 35 U.S.C. 154(b) by 881 days.

(21) Appl. No.: 17/065,203

(22) Filed: Oct. 7, 2020

(65) Prior Publication Data
US 2021/0122431 A1  Apr. 29, 2021

(30) Foreign Application Priority Data
Oct. 23, 2019 (DE) .......................... 102019216335.1

(51) Int. Cl.
| | |
|---|---|
| *B62D 33/06* | (2006.01) |
| *B60W 10/18* | (2012.01) |
| *B60W 10/20* | (2006.01) |
| *B60W 30/18* | (2012.01) |
| *B62D 33/063* | (2006.01) |
| *B62D 33/077* | (2006.01) |
| *B62D 65/02* | (2006.01) |

(52) U.S. Cl.
CPC ........... *B62D 33/063* (2013.01); *B60W 10/18* (2013.01); *B60W 10/20* (2013.01); *B60W 30/18* (2013.01); *B62D 33/0617* (2013.01); *B62D 33/077* (2013.01); *B62D 65/024* (2013.01)

(58) Field of Classification Search
CPC ...... B62D 65/02; B62D 65/024; B62D 65/04; B62D 33/0621; B62D 33/073; B62D 33/077
USPC ........ 296/35.1, 35.3, 26.01, 4, 6, 7, 193.4, 8
See application file for complete search history.

(56) References Cited

U.S. PATENT DOCUMENTS

| | | | | |
|---|---|---|---|---|
| 3,360,295 | A | * 12/1967 | Reynolds | ........... B62D 33/0636 296/190.04 |
| RE29,123 | E | * 1/1977 | Malm | .................... B60R 21/131 296/35.1 |
| 4,421,188 | A | 12/1983 | Fredriksen | |
| 4,427,090 | A | * 1/1984 | Fredriksen | ........... B62D 33/073 296/190.04 |
| 4,790,711 | A | * 12/1988 | Calaway | ............ B62D 33/0633 180/326 |

(Continued)

FOREIGN PATENT DOCUMENTS

| | | |
|---|---|---|
| EP | 2173581 A1 | 4/2010 |
| JP | S5199317 U | 8/1976 |

(Continued)

OTHER PUBLICATIONS

European Search Report issued in counterpart application No. 20198100.8 dated Mar. 19, 2021 (06 pages).

*Primary Examiner* — Dennis H Pedder

(57) ABSTRACT

A method is provided for receiving a vehicle cab in a reversible manner on an agricultural base vehicle. The method includes providing a supporting structure on the base vehicle and selectively receiving the vehicle cab in a receiving region of the supporting structure or removing the vehicle cab from the receiving region as a function of a predetermined operation of the base vehicle.

36 Claims, 4 Drawing Sheets

(56) References Cited

U.S. PATENT DOCUMENTS

| | | | | |
|---|---|---|---|---|
| 6,022,182 A | * | 2/2000 | Everett | B66F 9/07545 |
| | | | | 414/667 |
| 6,942,041 B1 | | 9/2005 | Kraus et al. | |
| 7,004,275 B1 | * | 2/2006 | Junga | E01C 19/26 |
| | | | | 180/327 |
| 7,204,546 B2 | * | 4/2007 | Antonetti | B62D 33/0633 |
| | | | | 296/190.04 |
| 10,214,928 B2 | * | 2/2019 | Allison | H04W 4/80 |
| 2006/0284448 A1 | * | 12/2006 | Heilmann | B62D 33/073 |
| | | | | 296/190.04 |

FOREIGN PATENT DOCUMENTS

| | | | | |
|---|---|---|---|---|
| WO | WO-7900118 A | * | 3/1979 | B62D 33/063 |
| WO | WO2009019330 A1 | | 2/2009 | |

* cited by examiner

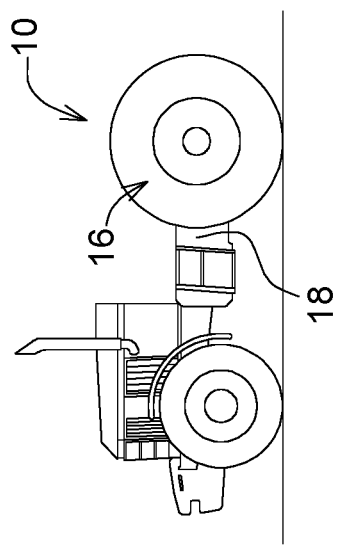
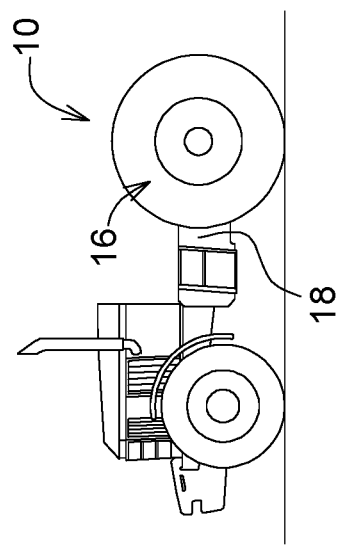
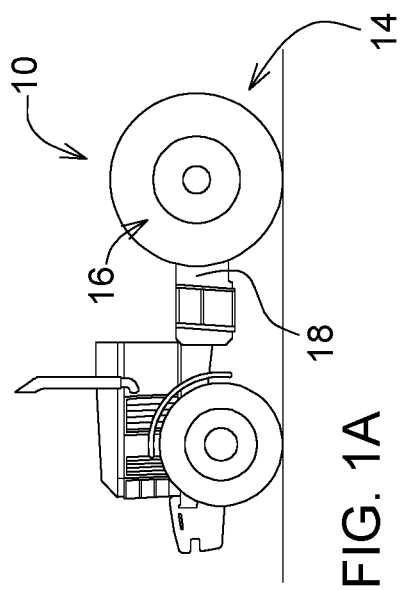
FIG. 1A
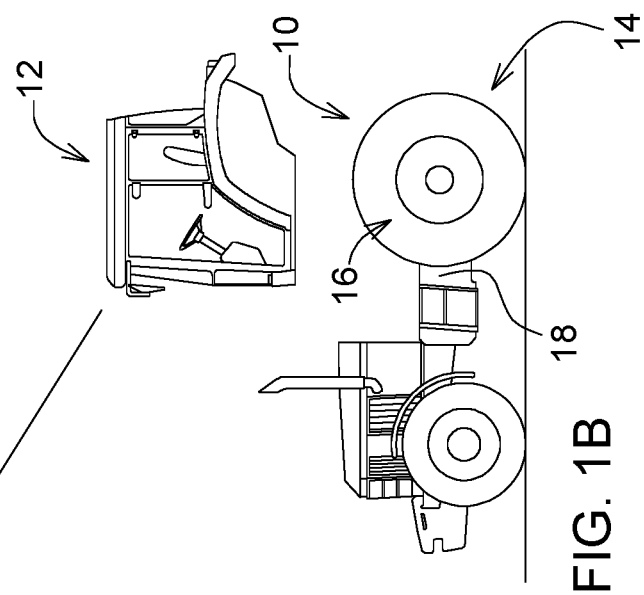
FIG. 1B
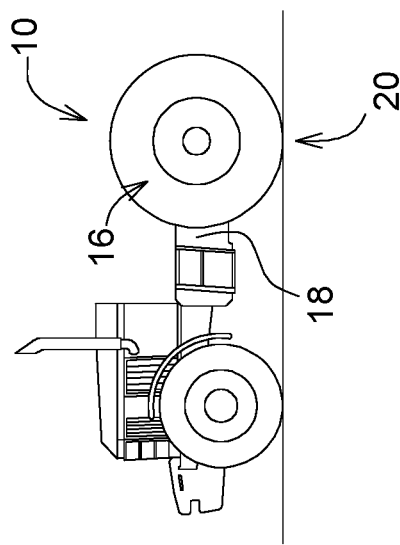
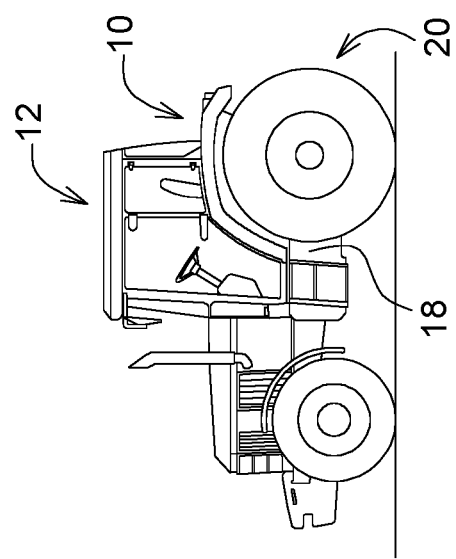

METHOD FOR RECEIVING A VEHICLE CAB ON AN AGRICULTURAL BASE VEHICLE

RELATED APPLICATIONS

This application claims priority to German Application No. 102019216335.1, filed Oct. 23, 2019, the disclosure of which is hereby expressly incorporated by reference in its entirety.

FIELD OF THE DISCLOSURE

The present disclosure relates to a method for receiving a vehicle cab in a reversible manner on an agricultural base vehicle.

BACKGROUND

During operation, agricultural vehicles, in particular tractors, are manually controlled by a driver but are also partially operated in an automated manner, for example, with assistance from a position detection system (for example, GPS). Agricultural vehicles, therefore, are operated in different modes.

There is a need to provide different operating modes in agricultural vehicles in a cost-effective manner.

SUMMARY

According to the present disclosure, a vehicle cab is received in a reversible manner on an agricultural base vehicle. In this case, the agricultural base vehicle has a supporting structure (for example, a chassis, frame, etc.) which is configured such that the vehicle cab is selectively received in a receiving region of the supporting structure or removed from the receiving region of the supporting structure as a function of a specific predetermined operation.

Thus, it is provided that a vehicle cab may be dispensed with in certain operations. The base vehicle may be operated cost-effectively, therefore, in specific operations—namely without a vehicle cab. The base vehicle thus only has to be provided with a vehicle cab when the operation of this vehicle actually has to be driven, monitored and controlled by a driver from the vehicle cab.

In other operating modes, however, in particular in an autonomous operation of a vehicle, a vehicle cab may be dispensed with. Accordingly, in this case the vehicle is as a base vehicle in operation without a vehicle cab. In particular, the following operating modes for the base vehicle are relevant:
  a) autonomous actuation without a vehicle cab,
  b) autonomous actuation with a vehicle cab,
  c) manual actuation with a vehicle cab.

For example, base vehicles which, as following vehicles, follow a guide vehicle are in mode a). The guide vehicle is then operated in mode b) or c), in the latter case driven by a driver (so called platooning). This has a cost-saving effect, in particular, in the case of fleet management.

The base vehicle operates in mode c) when the operation is relatively complex, for example, as a front loader or with a power lift. In such cases, the vehicle cab is positioned onto the supporting structure so that the respective functions of the base vehicle may be directly operated or monitored from the vehicle cab.

A further advantage is that a plurality of base vehicles may be acquired relatively cost-effectively without there being the need to acquire an equal number of vehicle cabs. Comfort functions for the driver may be implemented in a targeted manner in the vehicle cab. Thus, constructional space on the supporting structure and energy (for example, fuel) may be saved when the base vehicle is operated without a vehicle cab.

In a further embodiment, the base vehicle has at least one technical function which is performed independently of a received vehicle cab. In particular, all of the technical functions of the base vehicle are performed independently of a received vehicle cab. Thus, in the case of a vehicle cab which is absent or removed, the base vehicle provides the basis for an automated, autonomous or remote-controlled operation. Accordingly, the user does not have to be located in the vehicle but may control the vehicle externally. This provides the user with enhanced protection from danger in specific processes. Additionally, the vehicle may be used safely in difficult terrain due to the lower center of gravity.

A vehicle cab or a functional device is selectively received in the receiving region of the supporting structure. Thus, when the vehicle cab is removed or not used, the receiving region may be advantageously used for other purposes. The functional device, for example, may be a ballast weight for rear axle loading or customer-specific structures (for example, seed hoppers, fuel tanks, other tanks, units). Additional containers in the receiving region advantageously increase the respective working capacity of the base vehicle. By providing ballasting in the receiving region, complex wheel ballasting may be dispensed with. Units are, for example, electrical generators, additional batteries, hydraulic units, optionally with a greater volume of hydraulic fluid.

The receiving region of the supporting structure contains at least one coupling interface which corresponds to a cab interface of the received vehicle cab. These interfaces facilitate a connection (for example, electrical, hydraulic, data, steering, brake system), which is functionally correct and automatic and which is simple in terms of mounting technology, between the vehicle cab and the base vehicle. Thus, individual functions of the base vehicle (for example, steering, braking) may be performed from the vehicle cab as soon as the vehicle cab has been positioned in the receiving region of the supporting structure, without an additional installation cost. The interfaces are standardized. The interfaces facilitate, in particular, an "x-by-wire" technology. In another embodiment of an interface function, the interfaces which correspond to one another are configured for a releasable blocking (for example, hydraulic, electromagnetic) of the received vehicle cab.

The vehicle cab may be received or removed by an external auxiliary device or by an auxiliary device fixed to the supporting structure. For these displacement movements of the vehicle cab a movable, in particular pivotally movable, lifting device is arranged on the supporting structure. The vehicle cab may be received and removed thereby in a coordinated manner in terms of mounting technology.

The lifting device is controlled by a suitable control device in order to coordinate the lifting movements thereof relative to the receiving region. A control of the positioning or removal of the vehicle cab or a functional device may be performed directly on the base vehicle (for example, by a manual controller) or in an automated manner (for example, app-controlled). In this case, a predetermined operation of the base vehicle is represented by control data or control signals which are processed in the control device. The control device is able to control the movements of the lifting device as a function of the control data.

The supporting structure is configured such that the vehicle cab to be received may be selectively oriented forwards, i.e., in the forward direction of travel, or rearwards, relative to a longitudinal direction of the base vehicle. In other words, the vehicle cab may always be oriented in the direction of use. Alternatively or additionally, after being received, the vehicle cab may be rotatably arranged relative to a cab vertical axis so as to be oriented in the direction of the forward direction of travel or in the direction of the rearward direction of travel of the base vehicle, as required. The cab vertical axis runs parallel to a vehicle vertical axis which is oriented, in particular, vertically in the case of a horizontal driving surface. The selective orientation of the vehicle cab and, in particular, its rotatability permits a convenient and cost-saving operation of the vehicle in reversing mode, without the interior of the vehicle cab or individual functions having to be constructed in a complex manner for a reversing mode.

The agricultural base vehicle is, for example, a working machine, in particular a tractor or towing vehicle.

The above-described separate vehicle cab permits the flexible assignment thereof to one or more base vehicles. Thus, according to specific conditions it is possible to make a decision as to whether the relevant base vehicle, or which base vehicle, requires a vehicle cab.

The vehicle cab has a control unit which is connected to a cab interface (for example, a control device, input unit) for actuating a technical function of the base vehicle by a user or the driver. In this case, for performing the technical function of the base vehicle the cab interface corresponds to a coupling interface on the vehicle side. These interfaces ensure that, when the vehicle cab is received, technical functions of the base vehicle may be carried out automatically by the control unit by a user or driver without an additional installation cost.

The cost-effective operation of a base vehicle is, in particular, advantageous when within the context of an operation of a vehicle fleet with a plurality of base vehicles, for example, only one guide vehicle with one driver requires a vehicle cab and the remaining base vehicles are remotely controlled or autonomously driven by the guide vehicle, so that these base vehicles, as following vehicles, do not require a vehicle cab. By a "vehicle to vehicle" communication, the guide vehicle or the driver thereof may control the following vehicles and monitor the following vehicles during driving mode (for example, in road traffic, on a field). Thus, a single driver may drive a plurality of vehicles at one operating location. Thus, at the point of use itself, for example, on a field, different processes (for example, seed-bed preparation, seeding, subsequent surface compression) as well as the same process may be automated or performed autonomously in a shorter time. At the same time, it is sufficient that the person who is present in the guide vehicle monitors the vehicle fleet which is active at the point of use and if required intervenes relative to individual vehicles. These interventions may, for example, be technical settings on the vehicles or implements, adaptations of the vehicles to changing external conditions (for example, weather) or taking individual vehicles out of operation. The person who is present may also initiate a change of vehicle cab from one base vehicle to another base vehicle if this is advantageous for maintaining the quality of work.

A use of a single vehicle cab for a plurality of base vehicles which changes over time is also advantageous when different base vehicles are used chronologically in succession in terms of their use (for example, at specific times during the growing season, or lawn care in the summer versus snow clearance in the winter) and only the respectively used base vehicle requires a vehicle cab.

A method according to the present disclosure is described in more detail hereinafter with reference to the accompanying drawings. In this case, components which coincide or which are comparable regarding the function thereof are identified by the same reference numerals.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 1a shows a vehicle fleet with three base vehicles and a vehicle cab to be assigned, FIG. 1b shows the vehicle fleet according to FIG. 1a with the assigned vehicle cab oriented in a forward direction.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1C:
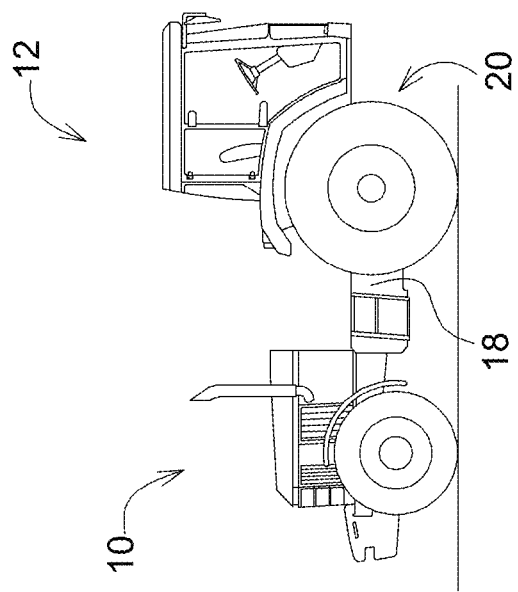
FIG. 1c shows one of the base vehicles according to FIG. 1a with the assigned vehicle cab oriented in a rearward direction.

FIG. 1a shows three agricultural base vehicles 10 in the form of tractors, in each case without a vehicle cab 12. Together the three base vehicles 10 form a vehicle fleet 14. In the embodiment shown a single vehicle cab 12 is available for this vehicle fleet 14.

Depending on a predetermined operation of the relevant base vehicle 10, the vehicle cab 12 is selectively received in a receiving region 16 of a supporting structure 18 of the base vehicle 10 or removed or kept at a distance therefrom. In FIG. 1a the base vehicle 10 to the far left is selected as a guide vehicle or leading vehicle 20. The vehicle cab 12 is assigned to this guide vehicle 20.

At least some of the technical functions (for example, steering, braking) of the base vehicle 10 are also able to be performed without a received vehicle cab 12. In this regard, the technical functions of the guide vehicle 20 may also be performed for example in an automated, autonomous or remotely controlled manner, in each base vehicle 10 following the guide vehicle 20.

Optionally, a vehicle cab 12 or a functional device, not shown here, (for example, a storage container, tank, technical unit) may be received in the receiving region 16.

Figure 2A:
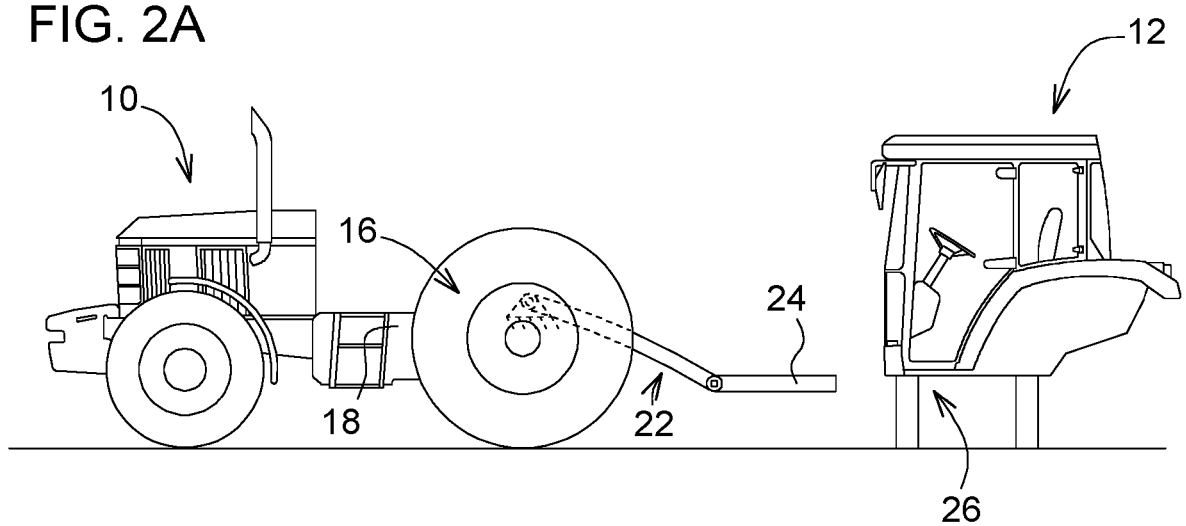
FIG. 2a shows a side view of a base vehicle according to FIG. 1a and a vehicle cab to be received.
Figure 2B:
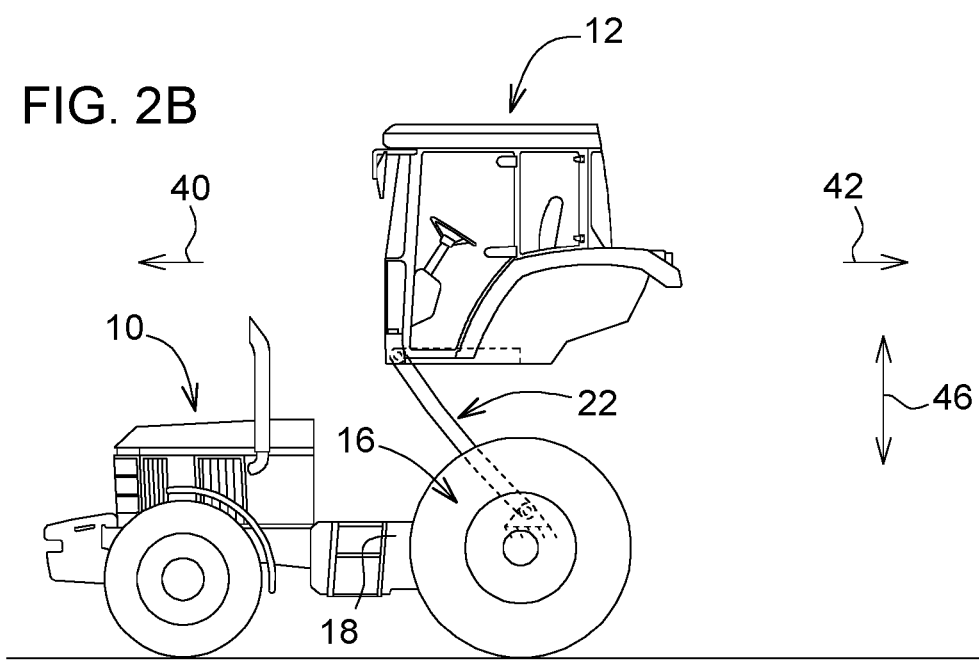
FIG. 2b shows a side view of the base vehicle according to FIG. 2a during the process for receiving the vehicle cab.

A pivotally movable and multi-armed lifting device 22 is mounted on the supporting structure 18. The lifting device serves for receiving the vehicle cab 12. To this end, the base vehicle 10 is initially moved toward the vehicle cab 12 (FIG. 2a). Then, a free end 24 of the lifting device 22 is secured to the vehicle cab 12 mounted on a bearing frame 26. The vehicle cab 12 is subsequently lifted into the receiving region 16 (FIG. 2b). The vehicle cab 12 is correspondingly removed again from the base vehicle 10 by the lifting device 22.

Figure 3:
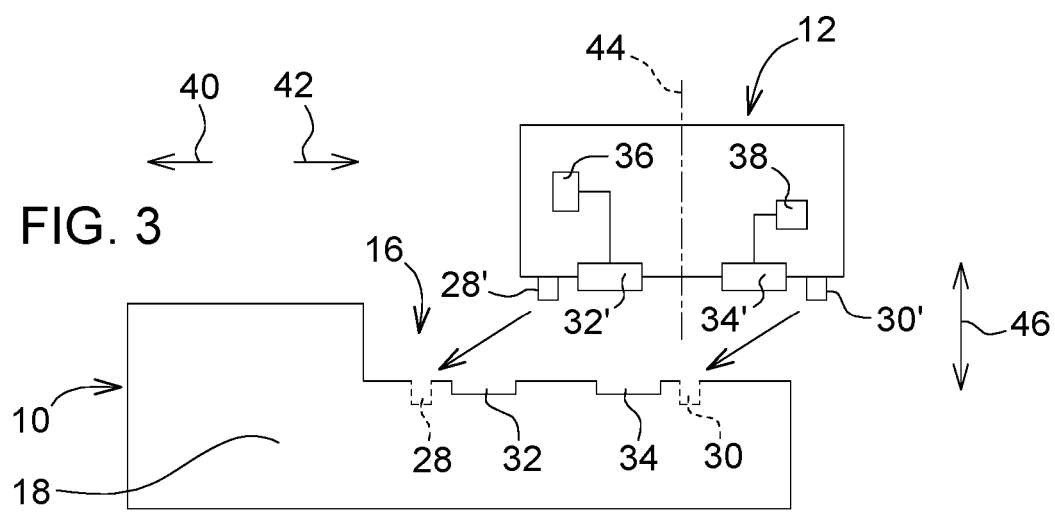
FIG. 3 shows a schematic view of a base vehicle and an assigned vehicle cab.

FIG. 3 schematically shows the base vehicle 10 and a corresponding vehicle cab 12. The receiving region 16 of the supporting structure 18 of the base vehicle 10 has four coupling interfaces 28, 30, 32, 34 which are coupled to corresponding cab interfaces 28', 30', 32', 34'. The interfaces 28, 28', 30, 30' effect a releasable blocking (for example, mechanical, hydraulic, electromagnetic) of the vehicle cab 12 on the supporting structure 18. However, the interfaces 32, 32', 34, 34' relate to technical functions of the base vehicle 10 which, when the vehicle cab 12 is received, may be performed by a user from the vehicle cab 12 via control units 36, 38 which are connected to the cab interfaces 32', 34'.

The supporting structure 18 is configured such that the vehicle cab 12 is able to be received so as to be selectively oriented for a forward direction of travel 40 or for a rearward direction of travel 42 of the base vehicle 10. Additionally, the received vehicle cab 12 may be rotatably mounted on the supporting structure 18 relative to a cab vertical axis 44. To this end, the vehicle cab 12 has a suitable construction which permits both the releasable blocking thereof and the rotatability thereof relative to the supporting structure 18.

The cab vertical axis 44 runs parallel to a vehicle vertical axis 46 of the base vehicle 10. The aforementioned rotatability of the vehicle cab 12 permits the user-friendly orientation thereof, both for forward travel and for rearward travel of the base vehicle 10.

Figure 4:
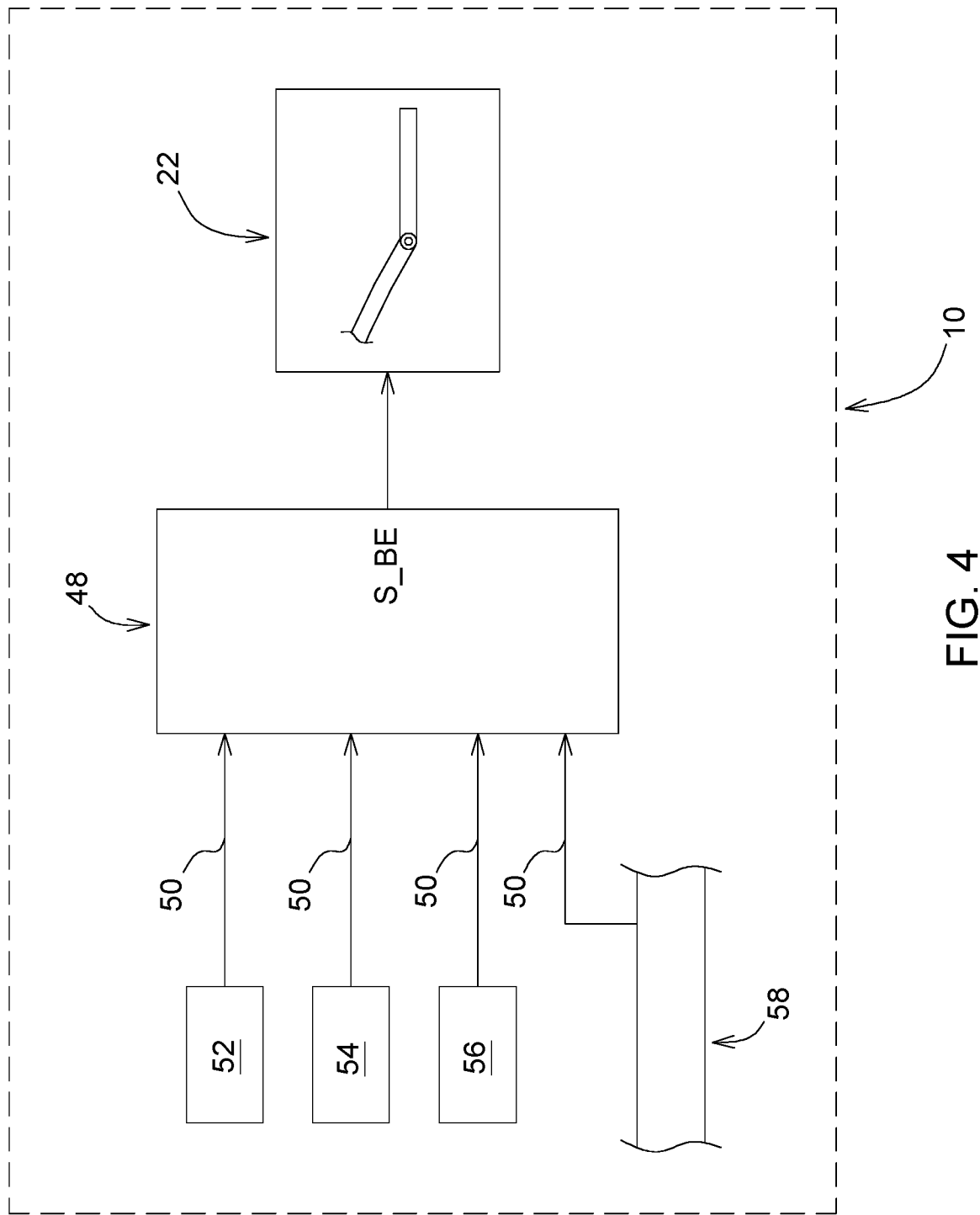
FIG. 4 shows a schematic view of components of a base vehicle for performing the method according to the present disclosure.

FIG. 4 schematically shows individual components of the base vehicle 10 for controlling the lifting device 22. The lifting device is controlled by a control device 48 as a function of a predetermined operation of the base vehicle 10, in order to receive or to remove the vehicle cab 12 as already described. The predetermined operation of the base vehicle 10 is represented by control data or control signals S_BE which are processed in the control device 48. The lifting device 22 is controlled in terms of movement by the control device 48 as a function of the control data S_BE.

The control data or control signals S_BE are generated as a function of input data 50 on the control device 48. The input data 50 are predetermined, for example, by the driver or user via a user interface 52. Alternatively or additionally, the input data 50 are predetermined by a sensor unit 54 on the vehicle side or a data interface 56 or a bus system 58 of the base vehicle 10. The data interface 56 is configured for the transmission of signals from an external signal source (for example, remote control, mobile telecommunication connection).

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method for receiving a vehicle cab in a reversible manner on an agricultural base vehicle, comprising:
    providing a supporting structure on the base vehicle;
    selectively receiving the vehicle cab in a receiving region of the supporting structure or physically and communicatively removing the vehicle cab from the base vehicle as a function of a predetermined operation of the base vehicle; and
    positioning the supporting structure such that the vehicle cab is rotatably arranged after being received.

2. The method according to claim 1, further comprising performing at least one technical function of the base vehicle when the vehicle cab, including a control unit allowing a user to control the at least one technical function from the vehicle cab, is physically and communicatively removed from the base vehicle.

3. The method according to claim 2, wherein the performing step comprises steering or braking.

4. The method according to claim 1, further comprising receiving a functional device in the receiving region when the vehicle cab, including a control unit allowing a user to control at least one technical function of the base vehicle from the vehicle cab, is physically and communicatively removed from the base vehicle.

5. The method according to claim 1, further comprising coupling at least one coupling interface of the receiving region of the supporting structure to at least one cab interface of the vehicle cab.

6. The method according to claim 1, further comprising arranging a movable lifting device for receiving or removing the vehicle cab on the supporting structure.

7. The method according to claim 6, wherein the predetermined operation is represented by control data and the lifting device is controlled in terms of movement as a function of the control data.

8. The method according to claim 1, further comprising positioning the supporting structure such that the vehicle cab is received so as to be selectively oriented for a forward direction of travel or a rearward direction of travel of the base vehicle.

9. A base vehicle, comprising:
    a supporting structure comprising a receiving region;
    a vehicle cab selectively positioned within the receiving region of the supporting structure and physically and communicatively removable from the base vehicle based on a predetermined operation of the base vehicle;
    wherein the vehicle cab is selectively positioned within the receiving region in either a forward direction or a rearward direction.

10. The base vehicle of claim 9, further comprising a pivotally movable lifting device mounted on the supporting structure, the lifting device configured to receive the vehicle cab.

11. The base vehicle of claim 10, further comprising a plurality of coupling interfaces on the supporting structure coupled to corresponding cab interfaces on the vehicle cab.

12. The base vehicle of claim 11, further comprising at least one control unit operably connected to the cab interfaces, the at least one control unit configured for allowing a user to control technical functions of the base vehicle, wherein the operable connection is configured for communication between the vehicle cab and the base vehicle via the cab interfaces and the coupling interfaces when the cab interfaces and the coupling interfaces are physically coupled.

13. The base vehicle of claim 10, further comprising a control device for operably controlling movement of the lifting device as a function of the predetermined operation.

14. The base vehicle of claim 13, wherein the control device receives input data from a sensor unit, data interface, or a bus system and outputs control signals for controlling the movement of the lifting device.

15. The base vehicle of claim 14, wherein the data interface is in communication with an external signal source for receiving a transmission of signals therefrom.

16. The base vehicle of claim 9, wherein the vehicle cab is rotatably mounted on the supporting structure.

17. A vehicle fleet, comprising:
   at least two base vehicles, wherein each of the at least two base vehicles comprises a supporting structure having a receiving region; and
   at least one vehicle cab selectively positioned within the receiving region of the supporting structure of one of the at least two base vehicles, the vehicle cab being selectively positioned and physically and communicatively removable from the base vehicle based on a predetermined operation of the base vehicle, wherein the vehicle cab is selectively positionable within the receiving region in either a forward direction or a rearward direction;
   wherein a number of vehicle cabs is less than a number of base vehicles.

18. The vehicle fleet of claim 17, wherein each of the at least two base vehicles is operable as either a guide vehicle or a following vehicle, wherein the at least one vehicle cab is selectively positioned within the receiving region of the supporting structure of the guide vehicle, and wherein another one of the at least two base vehicles is the following vehicle.

19. The vehicle fleet of claim 17, wherein each of the at least two base vehicles is operable as either a guide vehicle or a following vehicle, wherein the following vehicle is configured to follow the guide vehicle.

20. The vehicle fleet of claim 17, wherein each of the at least two base vehicles is operable as either a guide vehicle or a following vehicle, wherein the guide vehicle is configured to control the following vehicle by way of vehicle-to-vehicle communication.

21. The vehicle fleet of claim 20, wherein each of the at least two base vehicles is operable as either a guide vehicle or a following vehicle, wherein the guide vehicle is configured to monitor the following vehicle by way of vehicle-to-vehicle communication.

22. A method for receiving a vehicle cab in a reversible manner on an agricultural base vehicle, comprising:
   providing a supporting structure on the base vehicle;
   selectively receiving the vehicle cab in a receiving region of the supporting structure or physically and communicatively removing the vehicle cab from the base vehicle as a function of a predetermined operation of the base vehicle; and
   positioning the supporting structure such that the vehicle cab is selectively positioned within the receiving region in either a forward direction or a rearward direction.

23. The method according to claim 22, further comprising performing at least one technical function of the base vehicle when the vehicle cab, including a control unit allowing a user to control the at least one technical function from the vehicle cab, is physically and communicatively removed from the base vehicle.

24. The method according to claim 23, wherein the performing step comprises steering or braking.

25. The method according to claim 22, further comprising receiving a functional device in the receiving region when the vehicle cab, including a control unit allowing a user to control at least one technical function of the base vehicle from the vehicle cab, is physically and communicatively removed from the base vehicle.

26. The method according to claim 22, further comprising coupling at least one coupling interface of the receiving region of the supporting structure to at least one cab interface of the vehicle cab.

27. The method according to claim 22, further comprising arranging a movable lifting device for receiving or removing the vehicle cab on the supporting structure.

28. The method according to claim 22, wherein the predetermined operation is represented by control data and the lifting device is controlled in terms of movement as a function of the control data.

29. A base vehicle, comprising:
   a supporting structure comprising a receiving region;
   a vehicle cab selectively positioned within the receiving region of the supporting structure and physically and communicatively removable from the base vehicle based on a predetermined operation of the base vehicle;
   wherein the vehicle cab is rotatably mounted within the receiving region.

30. The base vehicle of claim 29, further comprising a pivotally movable lifting device mounted on the supporting structure, the lifting device configured to receive the vehicle cab.

31. The base vehicle of claim 30, further comprising a plurality of coupling interfaces on the supporting structure coupled to corresponding cab interfaces on the vehicle cab.

32. The base vehicle of claim 31, further comprising at least one control unit operably connected to the cab interfaces for allowing a user to control technical functions of the base vehicle, wherein the operable connection is configured for communication between the vehicle cab and the base vehicle via the cab interfaces and the coupling interfaces when the cab interfaces and the coupling interfaces are physically coupled.

33. The base vehicle of claim 30, further comprising a control device for operably controlling movement of the lifting device as a function of the predetermined operation.

34. The base vehicle of claim 33, wherein the control device receives input data from a sensor unit, data interface, or a bus system and outputs control signals for controlling the movement of the lifting device.

35. The base vehicle of claim 34, wherein the data interface is in communication with an external signal source for receiving a transmission of signals therefrom.

36. The base vehicle of claim 29, wherein the vehicle cab is selectively positioned within the receiving region in either a forward direction or a rearward direction.

* * * * *